May 2, 1939.  H. O. STEPHENS  2,157,031
ELECTRICAL WINDING
Filed March 1, 1938

Inventor:
Howard O. Stephens,
by Harry E. Dunham
His Attorney.

Patented May 2, 1939

2,157,031

UNITED STATES PATENT OFFICE 2,157,031

ELECTRICAL WINDING

Howard O. Stephens, Pittsfield, Mass., assignor to General Electric Company, a corporation of New York Application March 1, 1938, Serial No. 193,321

4 Claims. (Cl. 175—362)

My invention relates to electrical windings such as are commonly used in electrical induction apparatus such as transformers and reactors, and it is particularly applicable in connection with windings including spaced disk coils connected in series by cross connections alternately connecting the inner and outer turns of adjacent coils. Where a cross connection meets a coil, it passes over one of the edges or corners of an adjacent turn of the coil and its insulation may be damaged and weakened by rubbing against this edge of the adjacent turn. The rubbing and damage may be caused by vibration during shipment, by variations in electromagnetic forces during operation, or by other causes. The turns of the coils are necessarily clamped tightly together so that any rubbing of the cross-over insulation against the corners of the adjacent turns should be avoided. In accordance with the invention a smooth, flat sheet of tough insulating material is provided between each cross-over and the adjacent turns of the two coils connected by the cross-over, the insulating sheet engaging the spacers between the coils to hold it securely in position and being so formed as not to interfere appreciably with circulation of a cooling medium between the coils.

Figure 1:
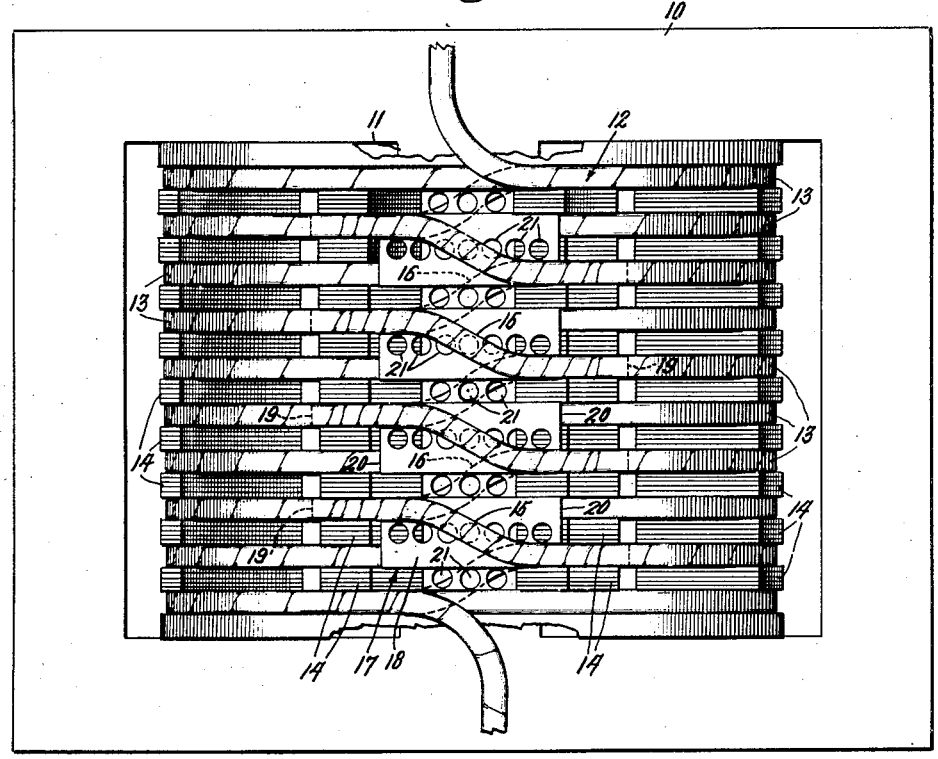
Figure 2:
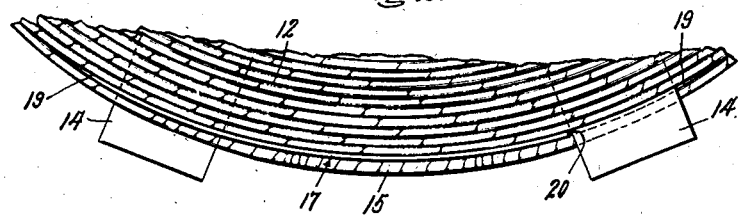
Figure 3:
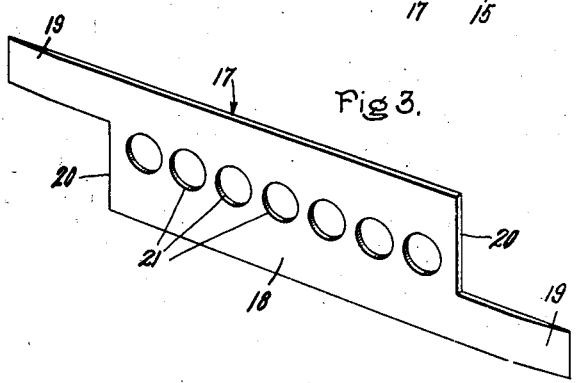
Figure 4:
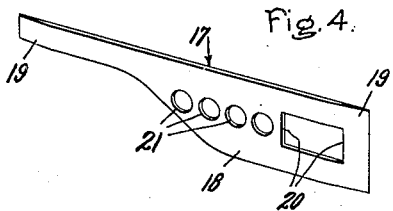

The invention will be better understood from the following description taken in connection with the accompanying drawing in which Fig. 1 is a side view of a winding having cross-over coil connections protected by insulating sheets formed and assembled in accordance with the invention; Fig. 2 is an enlarged face view of a small portion of one edge of one of the coils of the winding shown in Fig. 1; Fig. 3 is an enlarged perspective view of one of the cross-over protecting insulating sheets; and Fig. 4 is a perspective view of a modified form of insulating sheet.

Like reference characters indicate similar parts in the different figures of the drawing.

The electrical induction apparatus, shown in Fig. 1, includes a magnetic core 10 having a winding leg 11 and surrounded by a winding 12. The winding 12 is formed of a stack of disk coils 13 held in spaced relation by radial spacing strips 14. The coils 13 are connected in series by cross connections 15 between the outer turns of adjacent coils and cross connections 16 between the inner turns of adjacent coils.

Each of the cross connections 15 and 16 passes over a corner or edge of the adjacent turn of each of the coils which it connects and it is protected from rubbing and abrasion on these adjacent turns by an interposed, smooth sheet 17 of tough insulating material such as pressboard. Each of these sheets 17 of insulating material is formed in accordance with the invention to include a body portion 18 and suitable projections 19 for engaging the adjacent spacing strips 14 to hold the sheet 17 securely in position under its cross-over connection 15 or 16. In the form of the invention shown in Fig. 3 the projections 19 are of the same width as the thickness of the spacing strips 14 and they extend under the coil turns connected by the crossover so that they effectively prevent any displacement of the insulating sheet 17 in a direction perpendicular to the coils. The body portion 18 of the insulating sheet 17 is of such length that its transverse end edges 20 are close to the adjacent spacing strips 14 so that displacement of the insulating sheet in a direction along the edges of the coils 13 is effectively prevented. The projections 19, the edges or shoulders 20 and the overlying cross-over 15 or 16 secure the insulating sheet 17 in position and effectively prevent displacement of the sheet in any direction. The insulating sheets 17 are preferably provided with openings 21 to permit free flow of insulating and cooling fluid such as oil or air through the spaces between the coils 13.

The modified form of insulating sheet 17, shown in Fig. 4, includes a projection 19 on one end which extends completely around one of the spacing strips 14 so that displacement of the sheet is effectively prevented without the necessity of any shoulder 20 at the other end of the sheet. In this particular form of the insulating sheet 17, the projection 19 which surrounds a spacing strip 14 provides two oppositely disposed shoulders 20 for preventing displacement in either direction along the edges of the coils. Insulating sheets 17 of still other contours may be easily provided with spacer strip engaging portions which will effectively prevent displacement.

The insulating sheets 17 formed in accordance with the invention may be very easily and quickly formed by simple cutting or punching operations and they may be very easily and quickly assembled with the winding, no provision for securing them in position being necessary other than their engagement by the cross-over connections 15 and 16 and the spacing strips 14.

The invention has been explained by describing and illustrating preferred forms and arrangements thereof but it will be obvious that changes may be made without departing from the spirit of the invention and the scope of the appended claims.

What I claim as new and desire to secure by Letters Patent of the United States, is:

1. The combination in an electrical winding, of two spaced disk coils, radial spacing strips between said coils, a cross-over connection between said coils, and an insulating sheet between said cross-over connection and adjacent coil turns, the insulating sheet having spacing strip engaging projections and transverse end shoulders to prevent displacement of the sheet.

2. The combination in an electrical winding, of two spaced disk coils, radial spacing strips between said coils, a cross-over connection between said coils, and an insulating sheet between said cross-over connection and adjacent coil turns, the insulating sheet having transverse edges engaging said spacing strips to prevent displacement of the sheet.

3. The combination in an electrical winding, of two spaced disk coils, radial spacing strips between said coils, a cross-over connection between said coils, and an insulating sheet between said cross-over connection and adjacent coil turns, the insulating sheet having spacing strip engaging projections to prevent displacement of the sheet, and the sheet having openings to permit flow of an insulating fluid through the space between the coils.

4. The combination in an electrical winding, of two spaced disk coils, radial spacing strips between said coils, a cross-over connection between said coils, and an insulating sheet between said cross-over connection and adjacent coil turns, the insulating sheet having a body portion with end shoulders engaging the spacing strips and having projections extending between spacing strips to prevent displacement of the sheet.

HOWARD O. STEPHENS.